(12) United States Patent
Ogoshi et al.

(10) Patent No.: US 10,938,175 B2
(45) Date of Patent: Mar. 2, 2021

(54) LIGHT SOURCE FOR RAMAN AMPLIFICATION, LIGHT SOURCE SYSTEM FOR RAMAN AMPLIFICATION, RAMAN AMPLIFIER, AND RAMAN AMPLIFYING SYSTEM

(71) Applicant: FURUKAWA ELECTRIC CO., LTD., Tokyo (JP)

(72) Inventors: Haruki Ogoshi, Tokyo (JP); Masahito Morimoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 301 days.

(21) Appl. No.: 15/810,707

(22) Filed: Nov. 13, 2017

(65) Prior Publication Data

US 2018/0123311 A1  May 3, 2018

Related U.S. Application Data

(63) Continuation of application No. PCT/JP2016/064337, filed on May 13, 2016.
(Continued)

(30) Foreign Application Priority Data

Oct. 27, 2015  (JP) .............................. JP2015-210487

(51) Int. Cl.
*H01S 3/094*   (2006.01)
*H01S 3/067*   (2006.01)
(Continued)

(52) U.S. Cl.
CPC .... *H01S 3/094046* (2013.01); *H01S 3/06754* (2013.01); *H01S 3/0915* (2013.01);
(Continued)

(58) Field of Classification Search
CPC ......... H01S 3/094038; H01S 3/094042; H01S 3/094046; H01S 3/06754; H01S 3/0915; H01S 3/2316; H01S 3/302
See application file for complete search history.

(56) References Cited

U.S. PATENT DOCUMENTS 5,887,093 A * 3/1999 Hansen .............. G02B 6/29376
                                                    359/337.5
6,115,174 A * 9/2000 Grubb ..................... H01S 3/302
                                                      359/334
(Continued)

FOREIGN PATENT DOCUMENTS

JP    2000-214503    8/2000
JP    2001-222036    8/2001
(Continued)

OTHER PUBLICATIONS

International Search Report dated Aug. 16, 2016 in PCT/JP2016/064337, filed on May 13, 2016 (with English Translation).
(Continued)

*Primary Examiner* — Eric L Bolda
(74) *Attorney, Agent, or Firm* — Oblon, McClelland, Maier & Neustadt, L.L.P.

(57) ABSTRACT

A light source for Raman amplification to Raman-amplify signal light includes: plural incoherent light sources that output incoherent light; plural pumping light sources that output second-order pumping light; an optical fiber for Raman amplification to Raman-amplify the incoherent light with the second-order pumping light, and outputs the amplified incoherent light; and an output unit connected to the optical transmission fiber, receiving the amplified incoherent light, and outputting the amplified incoherent light as first-order pumping light having a wavelength that Raman-amplifies the signal light to the optical transmission fiber.

15 Claims, 10 Drawing Sheets

Related U.S. Application Data

(60) Provisional application No. 62/160,953, filed on May 13, 2015.

(51) Int. Cl.
| | | |
|---|---|---|
| *H01S 3/0915* | (2006.01) | |
| *H01S 3/23* | (2006.01) | |
| *H01S 3/30* | (2006.01) | |
| *H01S 3/0933* | (2006.01) | |
| *H01S 3/0941* | (2006.01) | |

(52) U.S. Cl.
CPC .. *H01S 3/094011* (2013.01); *H01S 3/094038* (2013.01); *H01S 3/2316* (2013.01); *H01S 3/302* (2013.01); *H01S 3/0933* (2013.01); *H01S 3/09415* (2013.01); *H01S 3/094003* (2013.01); *H01S 3/094096* (2013.01); *H01S 2301/02* (2013.01)

(56) References Cited

U.S. PATENT DOCUMENTS

| | | | |
|---|---|---|---|
| 6,147,794 A | 11/2000 | Stentz | |
| 6,163,636 A * | 12/2000 | Stentz | H01S 3/302 359/334 |
| 6,344,925 B1 * | 2/2002 | Grubb | H01S 3/094003 359/341.3 |
| 6,556,342 B1 | 4/2003 | Ellison et al. | |
| 6,587,261 B1 * | 7/2003 | Stephens | H01S 3/302 356/72 |
| 6,633,697 B2 | 10/2003 | Emori et al. | |
| 6,748,136 B2 | 6/2004 | Headley et al. | |
| 6,882,467 B1 | 4/2005 | Emori et al. | |
| 7,190,861 B2 | 3/2007 | Knopp et al. | |
| 7,215,836 B2 | 5/2007 | Vakhshoori et al. | |
| 7,233,431 B2 | 6/2007 | Bayart et al. | |
| 2002/0021864 A1 | 2/2002 | Emori et al. | |
| 2002/0105718 A1 * | 8/2002 | Bacher | H04B 10/2916 359/334 |
| 2003/0174938 A1 | 9/2003 | Headley et al. | |
| 2005/0078352 A1 | 4/2005 | Emori et al. | |
| 2005/0201675 A1 | 9/2005 | Knopp et al. | |
| 2014/0153083 A1 * | 6/2014 | Hakimi | G01B 9/02091 359/337.2 |

FOREIGN PATENT DOCUMENTS

| | | |
|---|---|---|
| JP | 2002-082366 A | 3/2002 |
| JP | 2003-295238 | 10/2003 |
| JP | 3676167 | 7/2005 |

OTHER PUBLICATIONS

Written Opinion dated Aug. 16, 2016 in PCT/JP2016/064337, filed on May 13, 2016.
Soko Kado et al. "Broadband flat-noise Raman amplifier using low-noise bi-directionally pumping sources," Optical Communication, ECOC '01. 27th European Conference, 2001, pp. 2.
Yoshihiro Emori et al., " Design of Noise Figure Spectrum of Raman Amplifiers Using Bi-Directional Pumping," Furukawa Review, No. 23, 2003, pp. 10 (with English Translation).
Yutaka Ohki et al. "Pump Laser Module for Co-propagating Raman Amplifier," Furukawa Review, No. 112, 2003, pp. 13 (with English Translation).
Kafing Keita et al., "Relative Intensity Noise Transfer of Large-Bandwidth Pump Lasers in Raman Fiber amplifiers", Journal of Optical Society America B , vol. 23, No. 12, Dec. 2006, pp. 8.
Office Action dated Mar. 3, 2020 in Japanese Application No. 2015-210487, along with an English translation.
"Latest Trends of Optical Fiber Raman Amplifiers", applied physics, Applied Physics Society, Nov. 10, 2001, vol. 70, No. 11, pp. 1299 to 1303.

\* cited by examiner

LIGHT SOURCE FOR RAMAN AMPLIFICATION, LIGHT SOURCE SYSTEM FOR RAMAN AMPLIFICATION, RAMAN AMPLIFIER, AND RAMAN AMPLIFYING SYSTEM

CROSS-REFERENCE TO RELATED APPLICATION(S)

This application is based on a continuation of International Application No. PCT/JP2016/064337, filed on May 13, 2016 which claims the benefit of priority of US provisional Application No. 62/160,953, filed on May 13, 2015 and the prior Japanese Patent Application No. 2015-210487, filed on Oct. 27, 2015, the entire contents of which are incorporated herein by reference.

BACKGROUND

The present disclosure relates to a light source for Raman amplification, a light source system for Raman amplification, a Raman amplifier, and a Raman amplifying system.

In optical fiber communication in the related art, a transmission distance and a transmission capacity have been increased by use of Erbium-Doped Fiber Amplifiers (ED-FAs) thus far. However, at present, it is thought to be desired to use not only the EDFA but also Raman amplification and, moreover, to effectively combining the EDFA and the Raman amplification. At present, what is mainly used as the Raman amplification is a backward pumping Raman amplification, in which pumping light is incident on an optical fiber for Raman amplification, such that the pumping light propagates in a direction opposite to a propagation direction of signal light. However, in order to achieve faster speed (100 Gb/s), longer transmission distance (100 km transmission), and wider bandwidth (utilization of the L-band and S-band) for the next generation, it is important to simultaneously use not only the backward pumping Raman amplification but also a technique, which is called "forward pumping Raman amplification", in which pumping light is incident on an optical fiber for Raman amplification in a manner that the pumping light propagates in the same direction as a propagation direction of signal light. This method may be called "bidirectionally pumped Raman amplification". In a case of using a wavelength multiplexing pumping technique, even when only the backward pumping Raman amplification is used, it is possible to achieve a flat and wider Raman gain. It has been reported, however, that without utilization of bidirectionally pumped Raman amplification, it is not possible to achieve a flat Noise Factor (NF) (see S. Kado, Y. Emori, S. Namiki, N. Tsukiji, J. Yoshida, and T. Kimura: ECOC'01 (2001), PD Paper 1.8; and Emori, Kado, and Namiki: "Design of Noise Figure Spectrum of Raman Amplifiers Using Bi-directional Pumping", Furukawa Electric Co. Review, No. 111 (2003), Page 10).

Here, a reason is explained why an incoherent pumping light source for forward pumping Raman amplification is newly required, separately from a 14XX nm band semiconductor laser module (LDM), which has been widely used as a pumping light source for the EDFA so far. Main properties desired in Raman amplification, in particular, in the forward pumping Raman amplification, will be listed below.
(1) Low Relative Intensity Noise (RIN) transfer
(2) Low Stimulated Brillouin Scattering (SBS)
(3) Low nonlinear effect In addition, in order to deal with a Dense Wavelength Division Multiplexing (or a broadband wavelength multiplexing) transmission (DWDM transmission) today, the following is desirable.
(4) Optical amplification by control of amplified gain over a broad wavelength region The RIN refers to an index obtained by normalization of a minute intensity fluctuation component of laser light by the total optical power. Since Raman amplification is a phenomenon, in which a lifetime of an excited level creating a gain is short (approximately several fs), when there is intensity noise in the pumping light source, the intensity noise directly becomes noise of the signal light through the amplification process. Since a lifetime of an excited level is long (approximately 10 ms) in the EDFA, there has been no such risk. Raman amplification has a very small gain per unit length as compared to the EDFA, but in forward pumping Raman amplification, by signal light and pumping light propagating together in the optical fiber over a long distance, noise in the pumping light is gradually transferred as noise in the signal light. This is called RIN transfer. In backward pumping Raman amplification, since signal light and pumping light oppose each other, a time period, in which the pumping light having a certain noise component and the signal light intersect each other, is short, and influence of the noise in the pumping light on the signal light is little. Further, since the noise in the pumping light is random, even if the signal light is influenced by the noise, as the signal light travels oppositely to the pumping light, the influence is averaged. As understood from the above, the property that the RIN transfer is low is desired in forward pumping Raman amplification; and in particular, in a dispersion-shifted fiber (DSF), in which a group velocity difference between signal light and pumping light is small and a time period of parallel transmission in the optical fiber is long, reduction of this RIN transfer is important.

The SBS is one of cubic nonlinear optical effects, and is a phenomenon, in which a part of light is scattered backward by acoustic phonons pumped in an optical fiber by light. Occurrence of the SBS in pumping light is not desirable because the pumping light is scattered backward and will no longer contribute effectively to Raman amplification. In general, the SBS is easily caused in pumping light sources, which output laser light of single mode oscillation and of narrow linewidths, when the total optical power intensities are the same, and thus the SBS can be reduced without reduction in the Raman gain, more for a pumping light source, in which optical power per longitudinal mode has been reduced by increase in the number of oscillating longitudinal modes. The SBS can be reduced even more effectively for a light source having a continuous oscillating longitudinal mode and a broad spectral width.

Nonlinear effect is desired to be avoided because the nonlinear effect may cause a distortion of signal light, and lead to a degradation of communication quality. In optical communication today, a wavelength multiplexing communication is generally used, and even if a power of signal light of one wavelength is small, by multiplexing, the overall power is increased. Even if, for example, the power of signal light of each wavelength is 1 mW, when one hundred wave multiplexing is carried out, the overall power becomes 100 mW. If the signal light is amplified at a certain position at once by a lumped constant type amplifier like the EDFA when loss in a transmission path is compensated by optical amplification of the signal light, power of the amplified signal light is introduced into the transmission path at once and thus nonlinear effects tend to be caused. In order to avoid this, gradual amplification with a distributed constant type amplifier, like Raman amplification, is advantageous. However, in forward pumping Raman amplification, on an incident side of a transmission path, the Raman-amplified gain exceeds the transmission loss in the optical fiber, which is the transmission path, and at this portion, the power of signal light in the optical fiber becomes greater than the power of signal light at the incident end, and an nonlinear effect is more likely to be caused. In order to avoid this, a use of a high-order Raman amplification has been considered, in which Raman amplification is repeated up to a wavelength where Raman pumping light can be used as pumping light of the signal light in a cascade manner. A principle thereof is as follows: for example, to perform Raman amplification on signal light of the 1550 nm band, pumping light of a wavelength of approximately 1450 nm is used, and in this case, the 1450 nm pumping light is Raman-amplified with pumping light having a wavelength of approximately 1350 nm, and the 1450 nm pumping light that has been Raman-amplified Raman-amplifies the signal light of the 1550 nm band. As a result, since the power of the 1450 nm pumping light that Raman-amplifies the signal light is small at the incident end of the transmission path, the Raman gain of the signal light of the 1550 nm band is small, and in accordance with the transmission of the signal light, the 1450 nm pumping light is amplified by the 1350 nm pumping light, and the Raman gain for the signal light of the 1550 nm band becomes greater. Thereby, when the transmission path is seen as a whole, the transmission path can be regarded as a transmission path, in which the loss in the transmission path and the Raman gain are nicely balanced to each other as if the transmission loss in the optical fiber is zero, so that it is possible to consider that the nonlinear effect can be reduced further. In this case, the 1450 nm pumping light may be called "First-order Pumping Light (FPL)", the 1350 nm pumping light may be called "Second-order Pumping Light (SPL)", and this system may be called a "Second-order pumping system". Under a similar principle, Raman pumping systems of higher orders, such as a 3rd-order and a 4th-order, have been studied, and low RIN transfer and low SBS are also desired for high quality transmission in such higher order Raman pumping systems.

In order to fulfill the above described four needs, various techniques have been disclosed (Pump Laser Module for Forward pumping Raman Amplifier, Furukawa Electric Co. Review, July 2003, No. 112, Pages 5 to 10; Kafing Keita, Philippe Delaye, Robert Fray, and Gerald Roosen, "Relative Intensity Noise Transfer of Large-Bandwidth Pump Lasers in Raman Fiber", Journal of Optical Society America B, Vol. 23, No. 12, Pages 2479 to 2485, December 2006; Japanese Patent No. 3676167; Specification of U.S. Pat. No. 7,190,861; Specification of U.S. Pat. No. 7,215,836; and Specification of U.S. Pat. No. 7,233,431).

However, properties of light sources for Raman amplification, light source systems for Raman amplification, Raman amplifiers, and Raman amplifying systems, which are able to simultaneously fulfill the above-described four needs, have not reached properties leading to practical use yet.

SUMMARY

According to an embodiment of the present disclosure, a light source for Raman amplification to Raman-amplify signal light transmitted through an optical transmission fiber by a stimulated Raman scattering phenomenon in the optical transmission fiber, includes: plural incoherent light sources that output incoherent light; plural pumping light sources that output second-order pumping light having a wavelength that Raman-amplifies the incoherent light; an optical fiber for Raman amplification that is connected to the plural incoherent light sources and the plural pumping light sources and that Raman-amplifies the incoherent light that has been input thereto with the second-order pumping light that has been input thereto, and outputs the amplified incoherent light; and an output unit that is connected to the optical transmission fiber, receives the amplified incoherent light that has been Raman-amplified by the optical fiber for Raman amplification, and outputs the amplified incoherent light as first-order pumping light having a wavelength that Raman-amplifies the signal light to the optical transmission fiber.

According to an embodiment of the present disclosure, a light source for Raman amplification to Raman-amplify, in an optical transmission fiber, signal light transmitted through the optical transmission fiber, includes: plural incoherent light sources that output incoherent light; plural pumping light sources that output second-order pumping light having a wavelength that Raman-amplifies the incoherent light; and an output unit that is connected to the plural incoherent light sources, the plural pumping light sources, and the optical transmission fiber, and that outputs the incoherent light and the second-order pumping light that have been input thereto so that the incoherent light and the second-order pumping light propagate in the same direction through the optical transmission fiber. Further, in the optical transmission fiber, the incoherent light that has been input thereto is Raman-amplified by the second-order pumping light that has been input thereto, and first-order pumping light having a wavelength that Raman-amplifies the signal light is generated.

According to an embodiment of the present disclosure, a light source system for Raman amplifiction for Raman-amplifying, in an optical transmission fiber, signal light transmitted through the optical transmission fiber, includes: a first light source unit including first plural incoherent light sources that output first incoherent light and a first output unit that is connected to the first plural incoherent light sources and the optical transmission fiber and outputs the first incoherent light to the optical transmission fiber; and a second light source unit including first plural pumping light sources that output first second-order pumping light having a wavelength that Raman-amplifies the first incoherent light and a second output unit that is connected to the first plural pumping light sources and the optical transmission fiber and outputs the first second-order pumping light to the optical transmission fiber. Further, the first output unit and the second output unit are connected to the optical transmission fiber so that the first incoherent light and the first second-order pumping light propagate in directions opposite to each other through the optical transmission fiber between the first output unit and the second output unit, and in the optical transmission fiber between the first output unit and the second output unit, the first incoherent light that has been input thereto is Raman-amplified by the first second-order pumping light that has been input thereto, and first-order pumping light having a wavelength that Raman-amplifies the signal light is generated.

BRIEF DESCRIPTION OF THE DRAWINGS

The needs, features, advantages and technical and industrial significance of this disclosure will be better understood by reading the following detailed description of presently preferred embodiments of the disclosure, when considered in connection with the accompanying drawings.

DETAILED DESCRIPTION

In the related art, main properties desired in Raman amplification, in particular, in the forward pumping Raman amplification, are as follows:
(1) Low Relative Intensity Noise (RIN) transfer
(2) Low Stimulated Brillouin scattering (SBS)
(3) Low nonlinear effect In addition, in order to deal with a Dense Wavelength Division Multiplexing (or a broadband wavelength multiplexing) transmission (DWDM transmission) today, the following is desirable.
(4) Optical amplification by control of amplified gain over a broad wavelength region Therefore, it is desired to fulfill those needs.

Hereinafter, with reference to the accompanying drawings, embodiments of a light source for Raman amplification, a light source system for Raman amplification, a Raman amplifier, and a Raman amplifying system according to the present disclosure will be described in detail. Note that the disclosure is not limited by these embodiments. Further, the same signs are used, as appropriate, to describe the same or corresponding elements throughout the drawings.

First Embodiment

Figure 1:
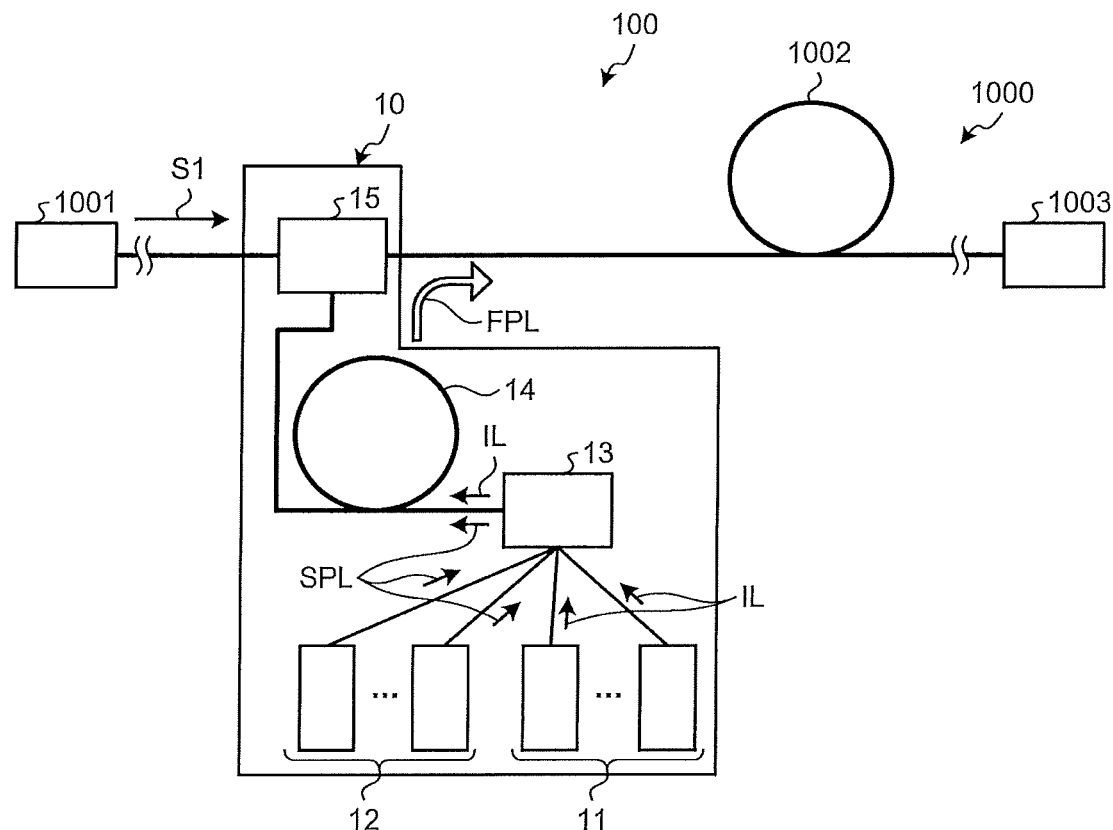
FIG. 1 is a schematic block diagram of a Raman amplifying system using a light source for Raman amplification according to a first embodiment.

FIG. 1 is a schematic block diagram of a Raman amplifying system using a light source for Raman amplification according to a first embodiment. As illustrated in FIG. 1, a Raman amplifying system 100 is applied to an optical transmission system 1000 including: a transmitter 1001 that transmits Signal light (S1) that is WDM signal light of the 1.55 µm band; an optical transmission fiber 1002 that is a transmission path that transmits therethrough the Signal light (S1); and a receiver 1003 that receives the Signal light (S1). The Raman amplifying system 100 includes a light source for Raman amplification 10 (hereinafter "Raman amplification light source 10") and the optical transmission fiber 1002. The Raman amplifying system 100 according to the first embodiment and Raman amplifying systems according to the following respective embodiments are also configured as Raman amplifiers.

The Raman amplification light source 10 includes plural incoherent light sources 11, plural pumping light sources 12, a Wavelength Division Multiplexing (WDM) coupler 13, an optical fiber for Raman amplification 14 (hereinafter "Raman amplification optical fiber 14"), and a WDM coupler 15 serving as an output unit.

The plural incoherent light sources 11 respectively output incoherent light beams IL having wavelengths different from each another. The incoherent light does not refers to a laser light source that oscillates in a single or plural discrete modes (longitudinal modes), but refers to light formed of a collection of uncorrelated photons having a continuous spectrum. Although the plural incoherent light sources 11 include at least one of a Super Luminescent Diode (SLD); a Semiconductor Optical Amplifier (SOA); and an Amplified Spontaneous Emission (ASE) light source including a rare earth doped optical fiber (for example, an Erbium-Doped Fiber (EDF)), in this first embodiment, it is assumed that all of the incoherent light sources 11 are SLDs.

The plural pumping light sources 12 output respective Second-order Pumping Light beams (SPL) having wavelengths that are different from each another and that Raman-amplify the Incoherent Light beams (IL). The plural pumping light sources 12 include at least one of semiconductor lasers of: the Fabry-Perot (FP) type; the FP-FBG type that is a combination of the FP type and an optical Fiber Bragg Grating (FBG); a Distributed FeedBack (DFB)-type; and a Distributed Bragg Reflector (DBR) type, these semiconductor lasers having wavelengths different from each other; and in this first embodiment, it is assumed that all of the plural pumping light sources 12 are the semiconductor lasers of the FP type.

Figure 2:
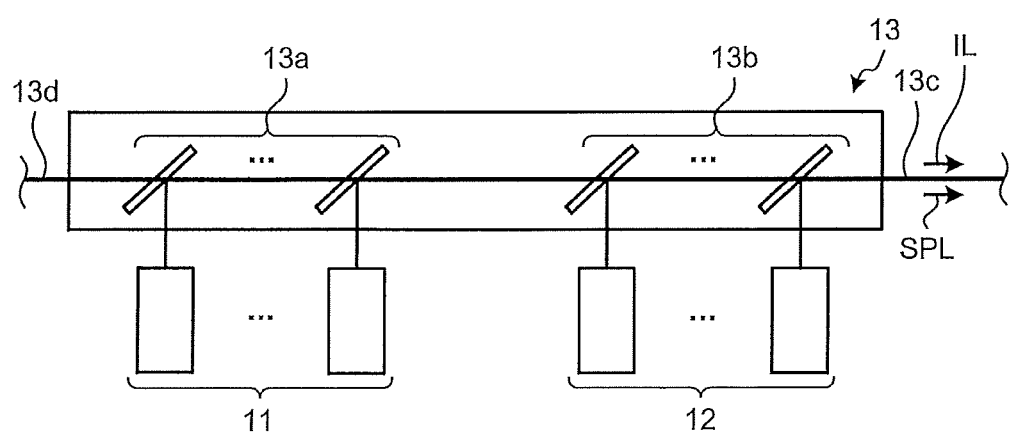
FIG. 2 is a diagram illustrating an example configuration of a Wavelength Division Multiplexing (WDM) coupler.

The WDM coupler 13 multiplexes the Incoherent Light beams (IL) and the Second-order Pumping Light beams (SPL) respectively and outputs the multiplexed light beams. FIG. 2 is a diagram illustrating an example configuration of the WDM coupler 13. The WDM coupler 13 has a configuration, in which plural WDM couplers 13a formed of multilayered dielectric filters, and plural WDM couplers 13b formed of multilayered dielectric filters are connected in serial by optical fibers. The WDM couplers 13a are connected to the respective incoherent light sources 11 by optical fibers, and each of the WDM couplers 13a has wavelength characteristics of: reflecting the Incoherent Light beam (IL) output from the incoherent light source 11 connected thereto; and transmitting light beams of other wavelengths. Similarly, the WDM couplers 13b are connected to the respective pumping light sources 12 by optical fibers, and each of the WDM couplers 13b has wavelength characteristic of: reflecting the Second-order Pumping Light beam (SPL) output from the pumping light source 12 connected thereto, and transmitting light beams of other wavelengths. Thereby, the WDM coupler 13 can multiplex the Incoherent Light beams (IL) and the respective Second-order Pumping Light beams (SPL) and outputs the multiplexed light beams from an output port 13c.

Figure 3:
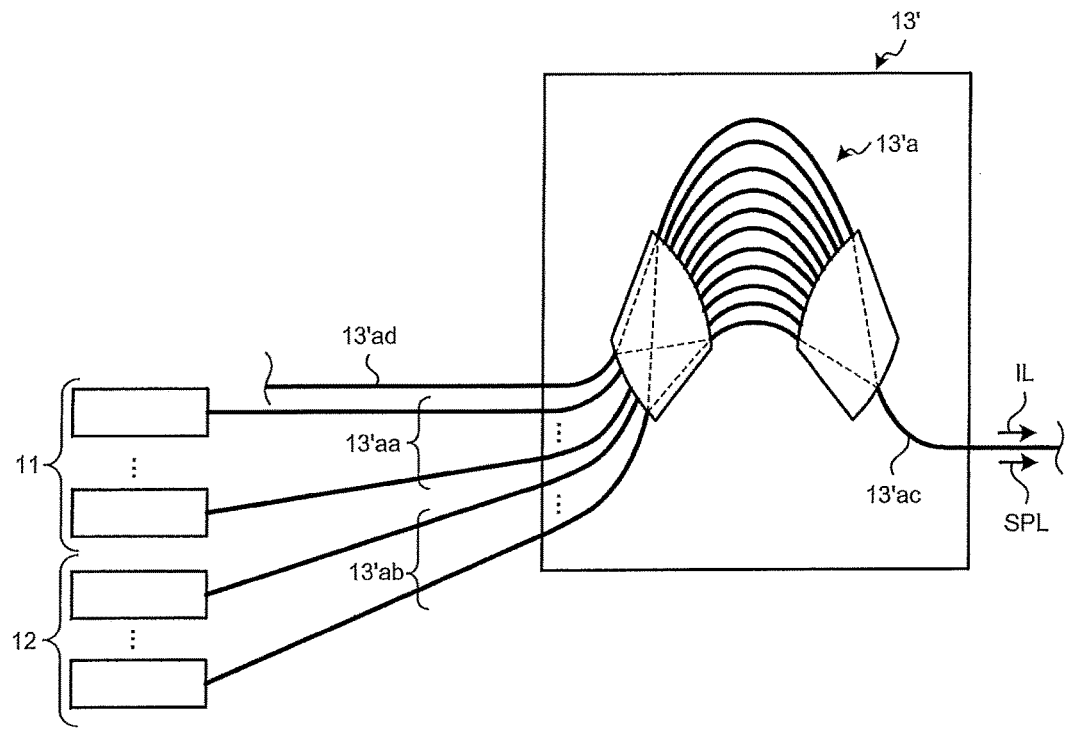
FIG. 3 is a diagram illustrating another example configuration of the WDM coupler.

FIG. 3 is a diagram illustrating a WDM coupler 13', which is another example configuration of the WDM coupler. The WDM coupler 13' includes an Arrayed Waveguide Grating (AWG) 13'a using a Planar Lightwave Circuit (PLC). Plural ports 13'aa at a multiport side of the AWG 13'a are connected to the respective incoherent light sources 11, and plural ports 13'ab are connected to the respective pumping light sources 12. Thereby, the WDM coupler 13' can multiplex the Incoherent Light beams (IL) and the Second-order Pumping Light beams (SPL) respectively, and to output the multiplexed light beams from an output port 13'ac.

Referring back to FIG. 1 again, the Raman amplification optical fiber 14 is connected to the plural incoherent light sources 11 and the plural pumping light sources 12 via the WDM coupler 13 Raman-amplifies the Incoherent Light beams (IL) input thereto by using the Second-order Pumping Light beams (SPL) input thereto, and outputs the Raman-amplified light beams as amplified incoherent light. The Raman amplification optical fiber 14 is a known optical fiber, such as a highly nonlinear optical fiber. The plural incoherent light sources 11 and the plural pumping light sources 12 are connected to the Raman amplification optical fiber 14 via the WDM coupler 13, such that the Second-order Pumping Light beams (SPL) forward pump the respective Incoherent Light beams (IL). That is, in the Raman amplification optical fiber 14, the Second-order Pumping Light beams (SPL) and the Incoherent Light beams (IL) have the same propagation direction.

The WDM coupler 15 serving as the output unit is connected to the optical transmission fiber 1002, receives the amplified incoherent light, and outputs the received amplified incoherent light as First-order Pumping Light (FPL) having a wavelength that Raman-amplifies the Signal light (S1) to the optical transmission fiber 1002. The WDM coupler 15 is a known WDM coupler using, for example, a multilayered dielectric filter. The WDM coupler 15 is connected to the optical transmission fiber 1002 such that the First-order Pumping Light (FPL) forward pumps the Signal light (S1). That is, the WDM coupler 15 is connected to the optical transmission fiber 1002 such that a propagation direction of the First-order Pumping Light (FPL) is the same as the propagation direction of the Signal light (S1). Thereby, the Signal light (S1) transmitted through the optical transmission fiber 1002 is Raman-amplified by the First-order Pumping Light (FPL) through a stimulated Raman scattering phenomenon in the optical transmission fiber 1002.

It is known that the RIN transfer from First-order Pumping Light to signal light can be reduced when incoherent light is used as the First-order Pumping Light, but since output power of incoherent light sources is generally small, it is difficult for an incoherent light source to be directly used as a First-order pumping light source for Raman amplification.

In relation to this, inventors of the present disclosure have found that even if incoherent light, which has been Raman-amplified by coherent Second-order pumping light, such as a semiconductor laser of the FP type, is used as First-order pumping light, the RIN transfer to signal light can be reduced. The Raman amplifying system 100 is configured to Raman-amplify the Signal light (S1) by use of the optical transmission fiber 1002, with incoherent light being the First-order Pumping Light (FPL), the incoherent light having been Raman-amplified by the Raman amplification optical fiber 14 in the Raman amplification light source 10 with the plural pumping light sources 12 formed of semiconductor lasers of the FP type being the Second-order Pumping Light beams (SPL). Thereby, low RIN transfer is realized.

Further, light emission wavelength bandwidths of the Incoherent Light beams (IL) are broader than those of coherent light sources, such as semiconductor lasers of the FP type, and peak intensities of the incoherent light beams IL are low as compared to the overall intensity of the light emission. Therefore, by amplification of the Incoherent Light beams (IL) and using the amplified Incoherent Light beams (IL) as the First-order Pumping Light (FPL), the low SBS can be realized. Furthermore, due to the broadness of the light emission wavelength bandwidths of the Incoherent Light beams (IL), phase matching conditions of optical four-wave mixing, which is a representative nonlinear effect, will be difficult to be satisfied, and thus occurrence of optical four-wave mixing will be prevented. Thereby, low nonlinear effect can be realized.

Further, since the plural incoherent light sources 11 that output the respective Incoherent Light beams (IL) having wavelengths different from each other and the plural pumping light sources 12 that output the respective Second-order pumping Light beams (SPL) having wavelengths different from each other are included, optical amplification is enabled with the amplified gain of the signal light being controlled over a broad wavelength region.

Accordingly, the above described four needs can be simultaneously fulfilled by the Raman amplification light source 10.

The wavelengths, numbers, bands, and powers of the pumping light sources 12 and the incoherent light sources 11 may be adjusted, as appropriate, according to the amplified band, desired gain, and gain flatness of the Signal light (S1) to be amplified.

Figure 4:
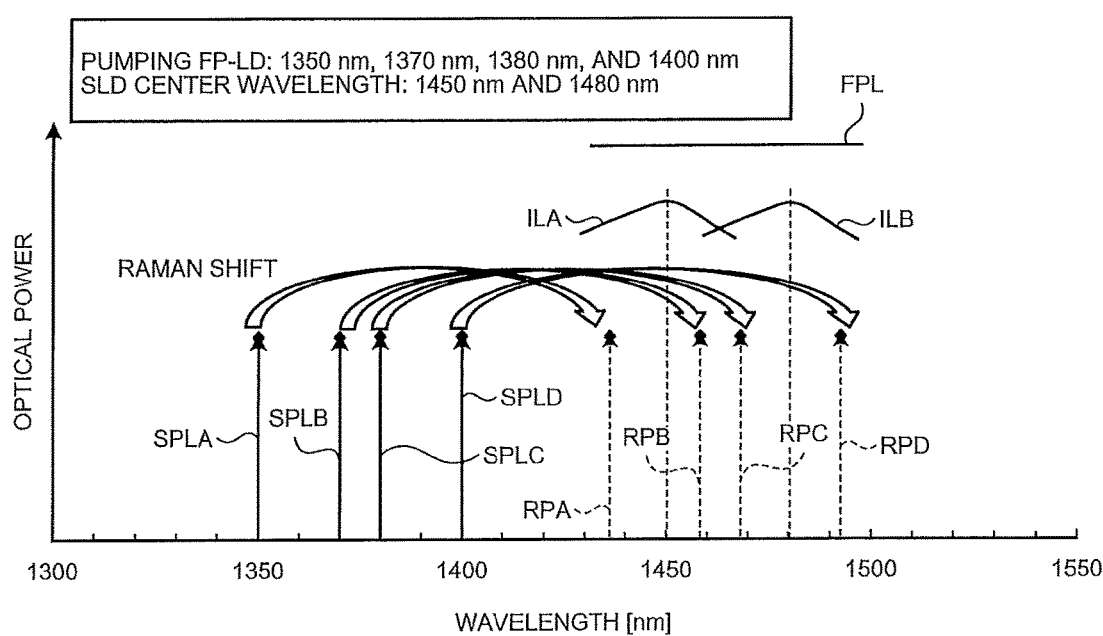
FIG. 4 is a diagram illustrating an example of arrangement of wavelengths of incoherent light and Second-order pumping light.

Next, an example of arrangement of wavelength and power of incoherent light and Second-order pumping light will be described. FIG. 4 is a diagram illustrating an example arrangement of the wavelengths of incoherent light and Second-order pumping light. In the example illustrated in FIG. 4, the number of incoherent light sources 11 (SLDs) is assumed to be two, and the number of the pumping light sources 12 (pumping FP-LDs) is assumed to be four. As illustrated in FIG. 4, wavelengths of Second-order Pumping Light beams (SPLA, SPLB, SPLC, and SPLD) are assumed to be 1350 nm, 1370 nm, 1380 nm, and 1400 nm, respectively, and all of their powers are assumed to be 250 mW. Further, wavelengths of Incoherent Light beams (ILA and ILB) are assumed to be 1450 nm and 1480 nm, respectively, all of their 3 dB bandwidths are assumed to be 30 nm, and all of their powers are assumed to be 5 mW. At respective longer wavelength side positions Raman-shifted by approximately 100 nm from the Second-order Pumping Light beams (SPLA, SPLB, SPLC, and SPLD), Raman gain bands are formed having respective peak positions at Raman Peaks (RPA, RPB, RPC, and RPD) due to the Second-order pumping light beams. Thereby, the Incoherent Light beams (ILA and ILB) are Raman-amplified to be First-order Pumping Light (FPL). In this example illustrated in FIG. 4, since the wavelengths of the Second-order pumping Light beams (SPLA, SPLB, SPLC, and SPLD) are set so that the Raman Peaks (RPA, RPB, RPC, and RPD) are positioned at the wavelengths with low optical power on the long wavelength side and the short wavelength sides relative to the respective wavelengths of the Incoherent Light beams (ILA and ILB), high Raman gains can be obtained relative to light beams of wavelengths low in optical power in the incoherent light beams ILA and ILB. As a result, the spectral shape of the First-order Pumping Light (FPL) becomes more flat with respect to the wavelength.

For example, in the first embodiment, when the Second-order pumping Light beams (SPLA, SPLB, SPLC, and SPLD), and the Incoherent Light beams (ILA and ILB) are set as described above, Raman-amplified incoherent light (First-order pumping light) of high power and a broad bandwidth in a range from approximately 1430 nm to approximately 1500 nm is obtained, and signal light of the C+L bands used in optical communication from approximately 1530 nm to approximately 1625 nm can be Raman-amplified.

In the plural incoherent light sources 11, the gain bandwidth can be increased easily when the wavelength bandwidth of pumping light is increased by using a combination of different types of incoherent light sources that output incoherent light beams of wavelength bandwidths different from each other, the different types of incoherent light sources being, for example: an SLD and an ASE light source with an EDF; an SOA and an ASE light source; or an SOA and an SLD. For example, when SOAs, which operate over a wavelength bandwidth of dozens of nanometers around the 1480 nm band are used as the incoherent light sources, the SOAs will be difficult to be operated at other wavelengths. Thus, if an SOA, and an SLD or an ASE light source are used together, the wavelength band of pumping light is not limited to the 1480 nm band, and can be enlarged to the 1300 nm band and the 1550 nm band. Further, the wavelength bandwidth of pumping light can be increased by using the ASE light source where an optical fiber is used which is connected to an optical fiber doped with rare earth elements different from each other (for example, Er; codoping with Yb and Er or a combination of Er and $Al_2O_3$; or semiconductor quantum dots of PbS) or an optical fiber codoped with different rare earth elements.

Second Embodiment

Figure 5:
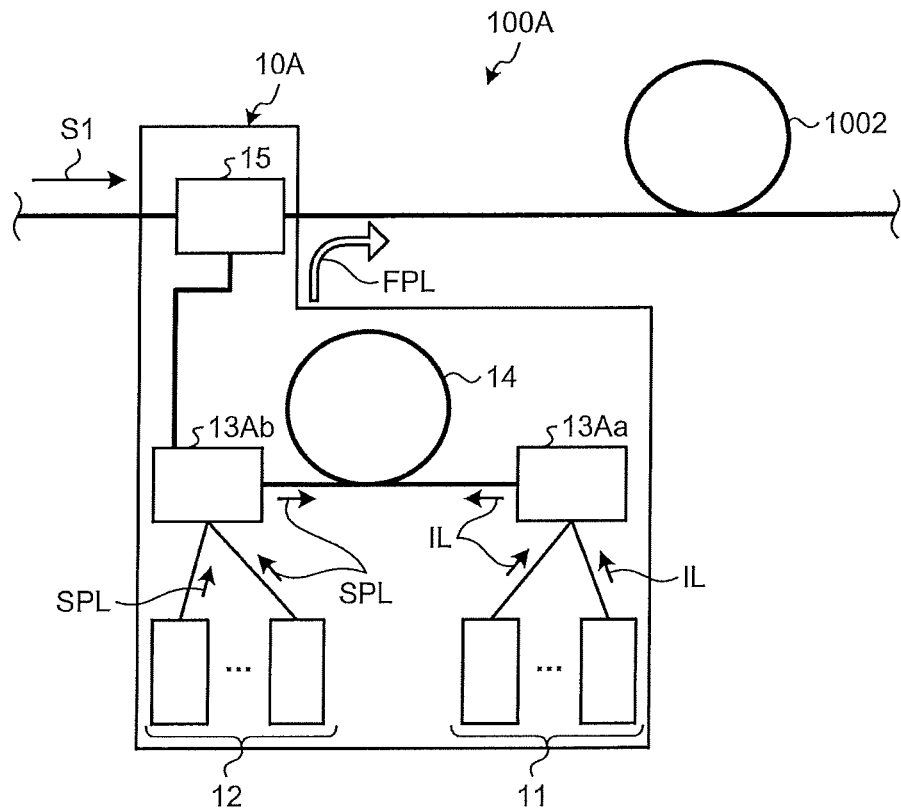
FIG. 5 is a schematic block diagram of a Raman amplifying system using a light source for Raman amplification according to a second embodiment.

FIG. 5 is a schematic block diagram of a Raman amplifying system using a light source for Raman amplification according to a second embodiment. A Raman amplifying system 100A includes a light source for Raman amplification 10A (hereinafter "Raman amplification light source 10A") and an optical transmission fiber 1002.

The Raman amplification light source 10A includes plural incoherent light sources 11, plural pumping light sources 12, WDM couplers 13Aa and 13Ab, an Raman amplification optical fiber 14, and a WDM coupler 15.

The WDM coupler 13Aa multiplexes incoherent light beams IL and outputs the multiplexed light beams. The WDM coupler 13Ab multiplexes Second-order pumping Light beams (SPL) and outputs the multiplexed light beams. The WDM couplers 13Aa and 13Ab may be provided by using multilayered dielectric filters or AWGs as illustrated in FIG. 2 and FIG. 3.

The Raman amplification optical fiber 14 is connected to the plural incoherent light sources 11 via the WDM coupler 13Aa, and is connected to the plural pumping light sources 12 via the WDM coupler 13Ab. The Raman amplification optical fiber 14 Raman-amplifies the respective Incoherent Light beams (IL) input thereto with the Second-order pumping Light beams (SPL) input thereto, and outputs the amplified Incoherent Light beams (IL) as amplified incoherent light. The plural incoherent light sources 11 and the plural pumping light sources 12 are connected to the respective Raman amplification optical fiber 14 via the WDM couplers 13Aa and 13Ab, such that the Second-order pumping Light beams (SPL) backward pump the respective Incoherent Light beams (IL). That is, in the Raman amplification optical fiber 14, the propagation directions of the Second-order pumping Light beams (SPL) and the propagation directions of the respective Incoherent Light beams (IL) are opposite to each other.

The WDM coupler 15 is connected to the optical transmission fiber 1002, receives the amplified incoherent light, and outputs the received amplified incoherent light as First-order Pumping Light (FPL) having a wavelength that Raman-amplifies the Signal light (S1) to the optical transmission fiber 1002. The WDM coupler 15 is connected to the optical transmission fiber 1002 so that the First-order Pumping Light (FPL) forward pumps the Signal light (S1). Thereby, the Signal light (S1) is Raman-amplified by the First-order Pumping Light (FPL) in the optical transmission fiber 1002.

By this Raman amplification light source 10A, similar to the Raman amplification light source 10, the above described four needs can be fulfilled simultaneously. Further, in the Raman amplification optical fiber 14 of this Raman amplification light source 10A, the Second-order pumping Light beams (SPL) Raman-amplify the respective Incoherent Light beams (IL) by backward pumping. Thereby, in the Second-order pumping Light beams (SPL), since the RIN transfer of the Incoherent Light beams (IL) is further reduced, the RIN transfer to the Signal light (S1) is also reduced further.

Third Embodiment

Figure 6:
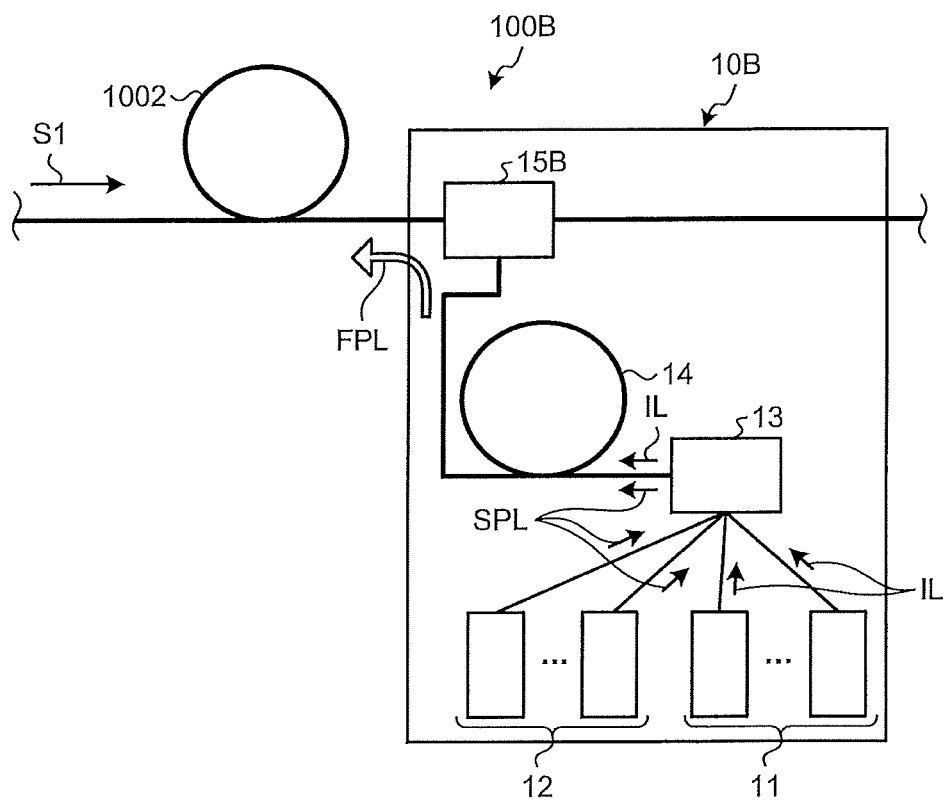
FIG. 6 is a schematic block diagram of a Raman amplifying system using a light source for Raman amplification according to a third embodiment.

FIG. 6 is a schematic block diagram of a Raman amplifying system using a light source for Raman amplification according to a third embodiment. A Raman amplification system 100B includes a light source for Raman amplification 10B (hereinafter "Raman amplification light source 10B") and an optical transmission fiber 1002.

The Raman amplification light source 10B has a configuration, in which the WDM coupler 15 of the Raman amplification light source 10 has been replaced with a WDM coupler 15B. The WDM coupler 15B is connected to the optical transmission fiber 1002, receives amplified incoherent light, and outputs the received amplified incoherent light as First-order Pumping Light (FPL) having a wavelength that Raman-amplifies Signal light (S1) to the optical transmission fiber 1002. The WDM coupler 15B is connected to the optical transmission fiber 1002 so that the First-order Pumping Light (FPL) backward pumps the Signal light (S1). That is, the WDM coupler 15B is connected to the optical transmission fiber 1002 such that a propagation direction of the First-order Pumping Light (FPL) is opposite to a propagation direction of the Signal light (S1). Thereby, the Signal light (S1) is Raman-amplified by the First-order Pumping Light (FPL) in the optical transmission fiber 1002.

By this Raman amplification light source 10B as well, similar to the Raman amplification light source 10, the above described four needs can be fulfilled simultaneously. Further, in a case of the Raman amplification light source 10B, low nonlinear effect can be reduced more than in a case of a forward pumping type like the Raman amplification light source 10. One of the reason is: due to the backward pumping type, after the Signal light (S1) starts receiving transmission loss in the optical transmission fiber 1002 so that the power of the Signal light (S1) starts reducing, the Signal light (S1) is amplified by the Raman amplification by the First-order Pumping Light (FPL), thus the power of the Signal light (S1) can be maintained less than that in a case of the forward pumping type in the optical transmission fiber 1002. The other reason is: since the First-order Pumping Light (FPL) propagates in the direction opposite to the direction in which the Signal light (S1) propagates, it is more difficult to fulfill the phase matching condition to obtain the nonlinear effect than in that case of the forward pumping type.

Fourth Embodiment

Figure 7:
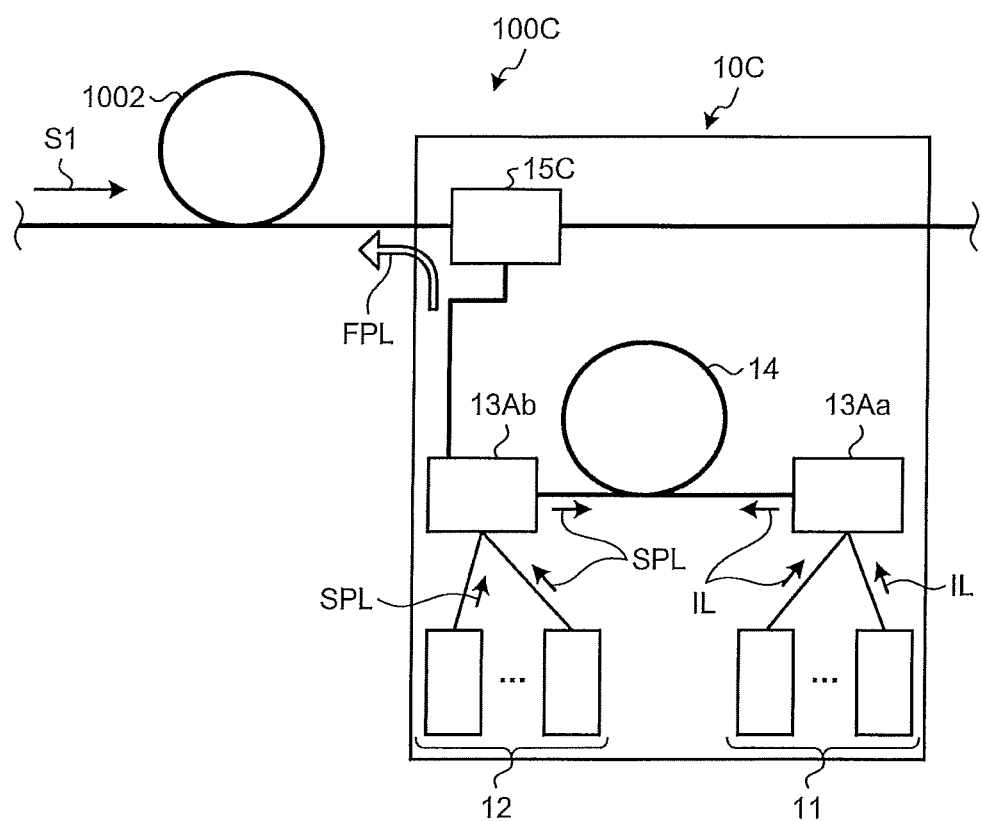
FIG. 7 is a schematic block diagram of a Raman amplifying system using a light source for Raman amplification according to a fourth embodiment.

FIG. 7 is a schematic block diagram of a Raman amplifying system using a light source for Raman amplification according to a fourth embodiment. A Raman amplifying system 100C includes a light source for Raman amplification 100 (hereinafter "Raman amplification light source 100") and an optical transmission fiber 1002.

The Raman amplification light source 100 has a configuration, in which the WDM coupler 15 of the Raman amplification light source 10A has been replaced with a WDM coupler 15C. The WDM coupler 15C is connected to the optical transmission fiber 1002, receives amplified incoherent light, and outputs the received amplified incoherent light as First-order Pumping Light (FPL) having a wavelength that Raman-amplifies Signal light (S1) to the optical transmission fiber 1002. The WDM coupler 15C is connected to the optical transmission fiber 1002 such that the First-order Pumping Light (FPL) backward pumps the Signal light (S1). That is, the WDM coupler 15C is connected to the optical transmission fiber 1002 so that a propagation direction of the First-order Pumping Light (FPL) is opposite to a propagation direction of the Signal light (S1). Thereby, the Signal light (S1) is Raman-amplified by the First-order Pumping Light (FPL) in the optical transmission fiber 1002.

By this Raman amplification light source 100 as well, similar to the Raman amplification light source 10, the above described four needs can be fulfilled simultaneously. Further, in an Raman amplification optical fiber 14 of this Raman amplification light source 100, similar to the Raman amplification light source 10A, Second-order pumping Light beams (SPL) Raman amplify the respective Incoherent Light beams (IL) by backward pumping. Thereby, in the Second-order pumping Light beams (SPL), since the RIN transfer of the Incoherent Light beams (IL) is further reduced, the RIN transfer to the Signal light (S1) is also reduced further.

Fifth Embodiment

Figure 8:
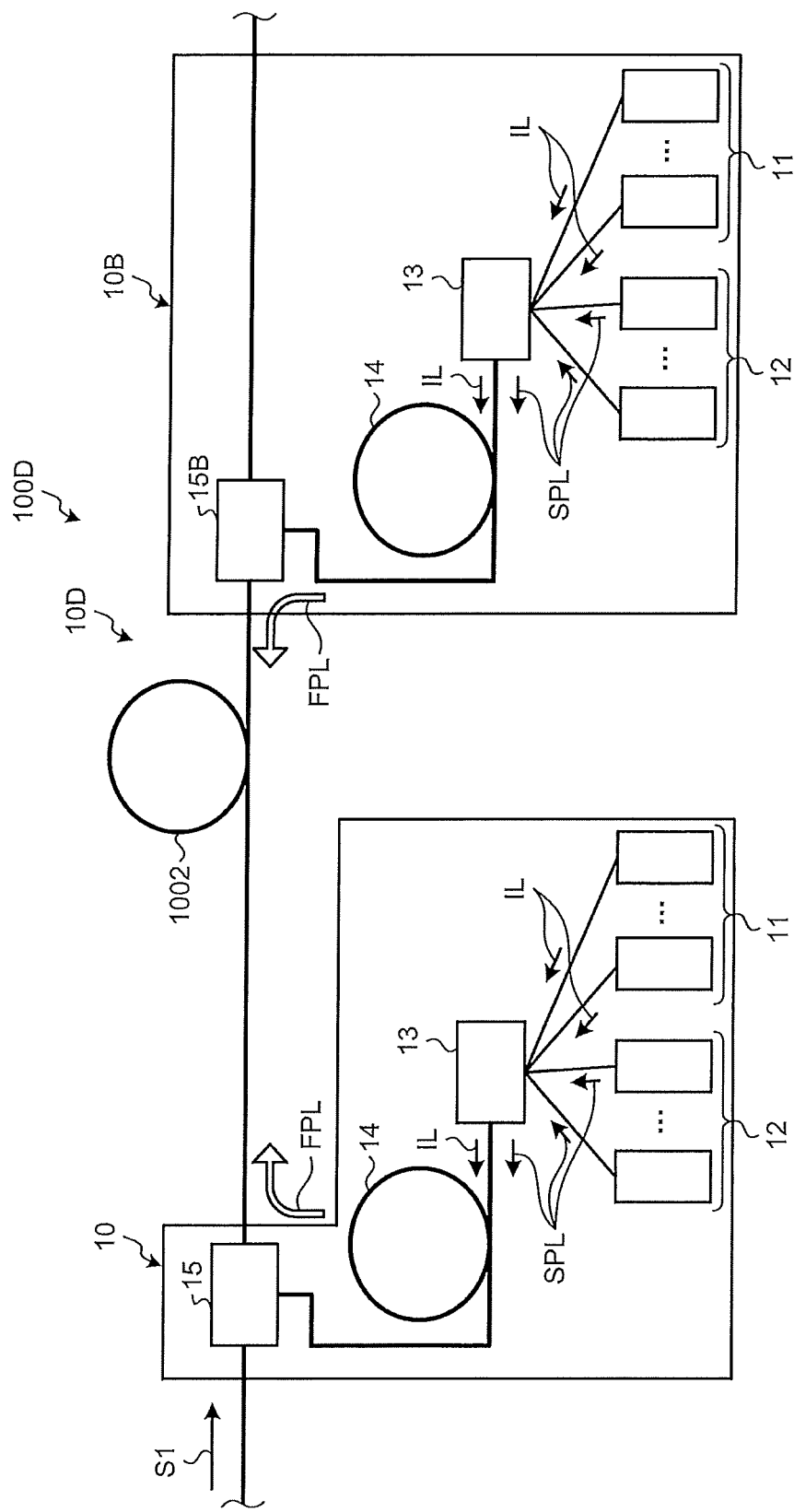
FIG. 8 is a schematic block diagram of a Raman amplifying system using a Raman amplification light source according to a fifth embodiment.

FIG. 8 is a schematic block diagram of a Raman amplifying system using a light source for Raman amplification according to a fifth embodiment. A Raman amplifying system 100D includes a light source system for Raman amplification 10D (hereinafter "Raman amplification light source system 10D") and an optical transmission fiber 1002.

The Raman amplification light source system 10D includes a Raman amplification light source 10 and a Raman amplification light source 10B. Further, WDM couplers 15 and 15B of the light sources for Raman amplification 10 and 10B are connected to the optical transmission fiber 1002 so that First-order Pumping Light (FPL) output from each of the WDM couplers 15 and 15B bidirectionally pumps Signal light (S1). That is, the Raman amplifying system 100D is a bidirectional pumping system using the Raman amplification light source system 10D.

By this Raman amplification light source system 10D as well, the above described four needs can be fulfilled simultaneously. Further, since the Raman amplification light source system 10D is of the bidirectional pumping type, an increase in flatness of wavelength of the Raman gain, an increase in the bandwidth, and an increase in flatness of wavelength of the NF can be achieved easily.

A bidirectionally pumped Raman amplifying system similar to the Raman amplifying system 100D may be formed by including: a light source system for Raman amplification which includes the Raman amplification light source 10A and the Raman amplification light source 10C and the WDM couplers 15 and 15C of the Raman amplification light sources 10A and 10C which are connected to an optical transmission fiber 1002 so that First-order Pumping Light (FPL) output from the WDM couplers 15 and 15C bidirectionally pumps Signal light (S1).

Sixth Embodiment

Figure 9:
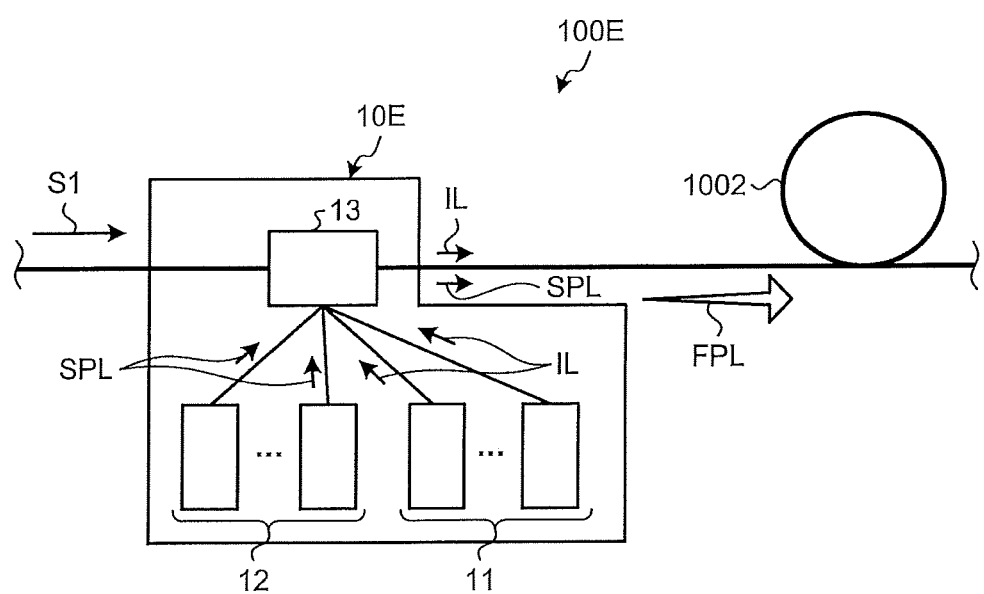
FIG. 9 is a schematic block diagram of a Raman amplifying system using a light source for Raman amplification according to a sixth embodiment.

FIG. 9 is a schematic block diagram of a Raman amplifying system using a light source for Raman amplification according to a sixth embodiment. A Raman amplifying system 100E includes a light source for Raman amplification 10E (hereinafter "Raman amplification light source 10E") and an optical transmission fiber 1002.

The Raman amplification light source 10E includes plural incoherent light sources 11, plural pumping light sources 12, and a WDM coupler 13 serving as an output unit.

The WDM coupler 13 is connected to the plural incoherent light sources 11, the plural pumping light sources 12, and the optical transmission fiber 1002, and outputs Incoherent Light beams (IL) received from the respective incoherent light sources 11 and Second-order pumping Light beams (SPL) received from the respective pumping light sources 12 so that the Incoherent Light beams (IL) and the Second-order pumping Light beams (SPL) propagate through the optical transmission fiber 1002 in the same direction. Further, the WDM coupler 13 is connected to the optical transmission fiber 1002 so that the Incoherent Light beams (IL) and the Second-order pumping Light beams (SPL) propagate in the same direction as that of Signal light (S1) in the optical transmission fiber 1002. This configuration can be realized by the WDM coupler 13 illustrated in FIG. 2 which is connected to the optical transmission fiber 1002 so that the Signal light (S1) is input from an input port 13d and output from the output port 13c. Furthermore, if the WDM coupler 13' illustrated in FIG. 3 is used, a port 13'ad for signal light multiplexing may be provided, and the WDM coupler 13' may be connected to the optical transmission fiber 1002 so that the Signal light (S1) is input from the port 13'ad, and the Signal light (S1), the incoherent light beams IL, and the Second-order pumping Light beams (SPL) that have been respectively multiplexed are output from the output port 13'ac.

In the optical transmission fiber 1002 of this Raman amplifying system 100E, the Incoherent Light beams (IL) are gradually Raman-amplified by the respective Second-order pumping Light beams (SPL), and First-order Pumping Light (FPL) having a wavelength that Raman-amplifies the Signal light (S1) is generated. The First-order Pumping Light (FPL) propagates in the same direction as that of the Signal light (S1) and Raman-amplifies the Signal light (S1). That is, the Raman amplifying system 100E is a Raman amplifying system of both the forward pumping type and the Second-order pumping type.

By this Raman amplification light source 10E as well, the above described four needs can be fulfilled simultaneously. Further, according to this Raman amplification light source 10E, although the Raman gain of the Signal light (S1) is small because the power of the First-order Pumping Light (FPL) that Raman-amplifies the Signal light (S1) is small at the optical transmission fiber 1002 near the WDM coupler 13; as the Signal light (S1) is transmitted through the optical transmission fiber 1002, the Incoherent Light beams (IL) are amplified by the Second-order pumping Light beams (SPL), the power of the First-order Pumping Light (FPL) is thus increased, and the Raman gain for the Signal light (S1) is increased. Thereby, when seen as a whole, the optical transmission fiber 1002 can be regarded as a transmission path, in which the transmission loss and the Raman gain are nicely balanced to each other as if the transmission loss in the optical fiber is zero, or the fluctuation of power of the Signal light (S1) in the longitudinal direction of the optical transmission fiber 1002 is small, and thus the nonlinear effect can be reduced further.

With the configuration of the Raman amplifying system 100E, as illustrated in FIG. 4, experiments of the Raman amplification were carried out under the conditions that the wavelengths of Second-order pumping Light beams (SPLA, SPLB, SPLC, and SPLD) are 1350 nm, 1370 nm, 1380 nm, and 1400 nm, respectively, all of their powers are 250 mW; the wavelengths of Incoherent Light beams (ILA and ILB) are 1450 nm and 1480 nm, respectively, all of their 3-dB bandwidths are 30 nm, and all of their powers are 5 mW. The Signal light (S1) was WDM signal light formed of signal light of four wavelengths, which were 1530 nm, 1560 nm, 1590 nm, and 1620 nm. Further, the length of the optical transmission fiber 1002 was 50 km. As a result, a Raman gain of approximately 10 dB was obtained for the signal light of each wavelength. Furthermore, a difference between the maximum Raman gain and the minimum Raman gain for the signal light of the four wavelengths was equal to or less than 1 dB.

Further, according to the Raman amplification light source 10E, the Raman amplifying system 100E can operate not only as a Second-order pumping system but also as a Third or higher-order pumping system by setting of the wavelengths of the Second-order pumping Light beams (SPL). For example, if (a) 1380 nm±20 nm is used as the wavelength of the Second-order pumping Light beams (SPL) and the SLDs of (b) 1480 nm±20 nm are used as the incoherent light sources 11, the Raman amplifying system 100E operates as a Second-order pumping Raman amplifying system, in which (b) is Raman-amplified by (a), and the amplified (b) Raman-amplifies the Signal light (S1) of a wavelength region around 1590 nm±20 nm.

Further, if, for example, (a) 1290 nm±20 nm and (a') 1380 nm±20 nm are used as wavelengths of the Second-order pumping Light beams (SPL), and the SLDs of (b) 1480 nm±20 nm are used as the incoherent light sources 11, the Raman amplifying system 100E operates as a Third-order pumping Raman amplifying system, in which: (a') is Raman-amplified by (a); the amplified (a') and (a') Raman-amplify (b); and the Raman-amplified (b) Raman-amplifies the Signal light (S1) of a wavelength region around 1590 nm±20 nm. In this case, the Raman amplification light source 10E includes a pumping light source that outputs pumping light having a wavelength that Raman-amplifies the Second-order pumping Light (SPL) output by at least one of the plural pumping light sources 12. When powers of (a), (a'), and (b) are adjusted, the above described four needs can be fulfilled simultaneously, and increase in flatness of the Raman gain, increase in the bandwidth, and increase in flatness of the NF can also be achieved easily.

Seventh Embodiment

Figure 10:
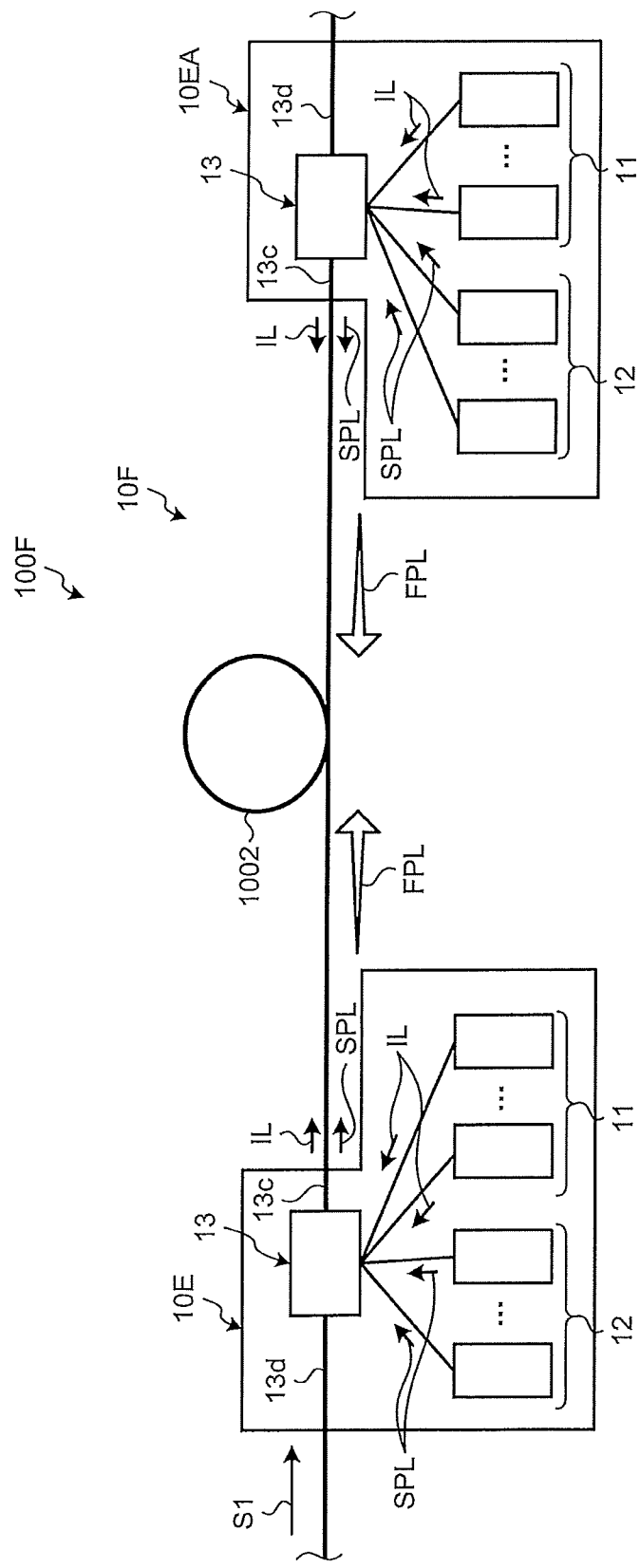
FIG. 10 is a schematic block diagram of a Raman amplifying system using a light source system for Raman amplification according to a seventh embodiment.

FIG. 10 is a schematic block diagram of a Raman amplifying system using a light source system for Raman amplification according to a seventh embodiment. A Raman amplifying system 100F includes a light source system for Raman amplification 10F (hereinafter "Raman amplification light source system 10F") and an optical transmission fiber 1002.

The Raman amplification light source system 10F includes a Raman amplification light source 10E and a light source for Raman amplification 10EA (hereinafter "Raman amplification light source 10EA"). The Raman amplification light source 10EA has a configuration, in which a WDM coupler 13 of the Raman amplification light source 10E has been connected to the optical transmission fiber 1002, so that Signal light (S1) is input from an output port 13c and output from an input port 13d. In the optical transmission fiber 1002, the Incoherent Light beams (IL) input from the Raman amplification light source 10EA are gradually Raman-amplified by the respective Second-order pumping Light beams (SPL), and First-order Pumping Light (FPL) having a wavelength that Raman-amplifies the Signal light (S1) is generated. The First-order Pumping Light (FPL) propagates in a direction opposite to that of the Signal light (S1) and Raman-amplifies the Signal light (S1). On the contrary, First-order Pumping Light (FPL) generated by the Raman amplification light source 10E propagates in the same direction as that of the Signal light (S1) and Raman-amplifies the Signal light (S1).

As described above, the WDM couplers 13 of the Raman amplification light sources 10E and 10EA are connected to the optical transmission fiber 1002 so that the First-order Pumping Light (FPL) bidirectionally pumps the Signal light (S1), and the Raman amplifying system 100F serves as a bidirectional pumping type and Second-order pumping type Raman amplifying system that uses the Raman amplification light source system 10F.

By this Raman amplification light source system 10F as well, the above described four needs can be fulfilled simultaneously, and similar to the case of the Raman amplification light source 10E, the non-linear effect can be reduced further, and moreover, since the Raman amplifying system 100F is of the bidirectional pumping type, the freedom of design of the power distribution of the Signal light (S1) in the longitudinal direction of the optical transmission fiber 1002 can be increased. For example, the longitudinal direction power distribution of the Signal light (S1) in addition to the amplified band, desired gain, and gain flatness of the Signal light (S1) to be amplified, can be adjusted based on the wavelengths, numbers, bands, and powers of the respective pumping light sources 12 and incoherent light sources 11 in each of the light sources for Raman amplification 10E and 10EA. Further, according to the Raman amplification light source system 10F, the Raman amplifying system 100F can operate not only as a Second-order pumping system but also as a Third or higher-order pumping system similar to the Raman amplifying system 100E.

Eighth Embodiment

Figure 11:
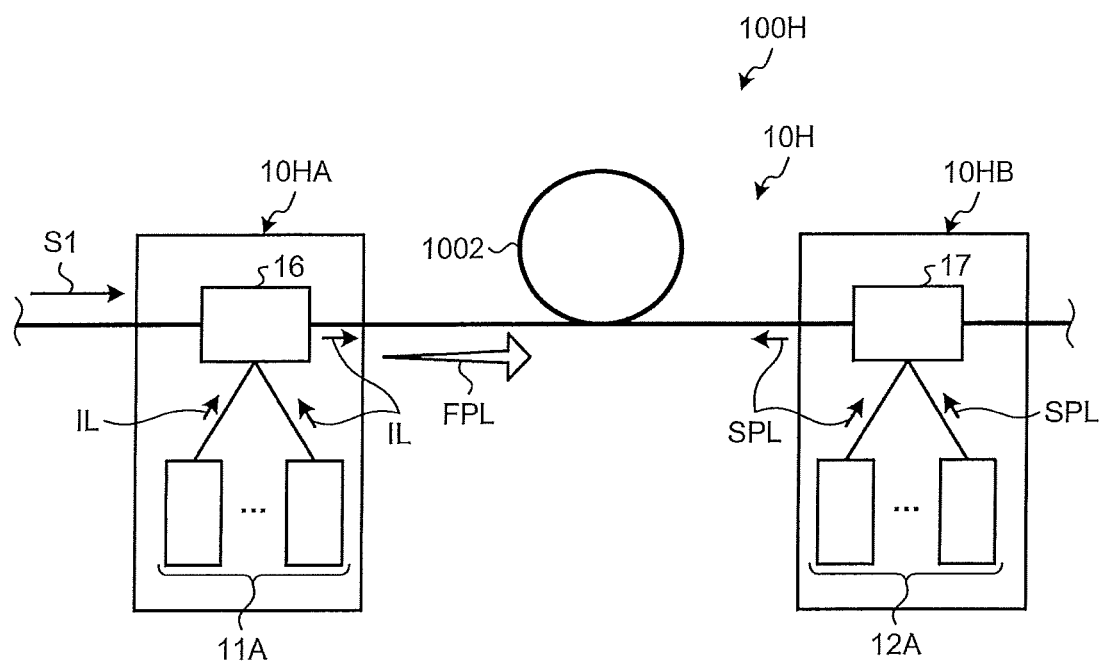
FIG. 11 is a schematic block diagram of a Raman amplifying system using a light source system for Raman amplification according to an eighth embodiment.

FIG. 11 is a schematic block diagram of a Raman amplifying system using a light source system for Raman amplification according to an eighth embodiment. A Raman amplifying system 100H includes a light source system for Raman amplification 10H (hereinafter "Raman amplification light source system 10H") and an optical transmission fiber 1002.

The Raman amplification light source system 10H includes a first light source unit 10HA and a second light source unit 10HB. The first light source unit 10HA includes first plural incoherent light sources 11A that output Incoherent Light beams (IL) and a WDM coupler 16 that is connected to the first plural incoherent light sources 11A and the optical transmission fiber 1002, and serves as a first output unit that outputs the Incoherent Light beams (IL) to the optical transmission fiber 1002. The second light source unit 10HB includes first plural pumping light sources 12A that output Second-order pumping Light beams (SPL) that Raman-amplify the Incoherent Light beams (IL); and a WDM coupler 17 that is connected to the first plural pumping light sources 12A and the optical transmission fiber 1002, and serves as a second output unit that outputs the Second-order pumping Light beams (SPL) to the optical transmission fiber 1002.

The first plural incoherent light sources 11A output, similar to the plural incoherent light sources 11, Incoherent Light beams (IL) having wavelengths different from each other. The first plural incoherent light sources 11A include at least one of the SLD, the SOA, and the ASE light source including a rare earth doped optical fiber, and in this eighth embodiment, all of the first plural incoherent light sources 11A are assumed to be the SLDs. The power of the Incoherent Light beams (IL) output from the respective incoherent light sources 11A is, for example, 40 mW.

The first plural pumping light sources 12A output the respective Second-order pumping Light beams (SPL) having wavelengths that are different from each other and that Raman-amplify the Incoherent Light beams (IL), similar to the plural pumping light sources 12. The first plural pumping light sources 12A include at least one of semiconductor lasers of the FP type, the FP-FBG type that is a combination of the FP type and an FBG, the DFB-type, and the DBR type, the semiconductor lasers having wavelengths different from each other, and in this eighth embodiment, all of the first plural pumping light sources 12A are assumed to be the semiconductor lasers of the FP type. The power of the Second-order pumping Light beams (SPL) output from the respective pumping light sources 12A is, for example, 500 mW.

The WDM coupler 16 and the WDM coupler 17 are connected to the optical transmission fiber 1002 so that the Incoherent Light beams (IL) and the Second-order pumping Light beams (SPL) propagate in opposite directions through the optical transmission fiber 1002 between the WDM coupler 16 and the WDM coupler 17. Thereby, specifically, the Incoherent Light beams (IL) propagate in the same direction as that of the Signal light (S1), and the Second-order pumping Light beams (SPL) propagate in a direction opposite to that of the Signal light (S1).

In this Raman amplification light source system 10H, in the optical transmission fiber 1002 between the WDM coupler 16 and the WDM coupler 17, the Incoherent Light beams (IL) input thereto are gradually Raman-amplified by the Second-order pumping Light beams (SPL), and First-order Pumping Light (FPL) having a wavelength that Raman-amplifies the Signal light (S1) is generated. The First-order Pumping Light (FPL) propagates in the same direction as that of the Signal light (S1) and Raman-amplifies the Signal light (S1). That is, the Raman amplifying system 100H is a Raman amplifying system of both the forward pumping type and the Second-order pumping type.

By this Raman amplification light source system 10H as well, the above described four needs can be fulfilled simultaneously. Further, according to this Raman amplification light source system 10H, due to functions similar to those of the Raman amplification light source 10E, when seen as a whole, the optical transmission fiber 1002 can be regarded as a transmission path, in which the transmission loss and the Raman gain are nicely balanced to each other as if the transmission loss in the optical fiber is zero, or the fluctuation of power of the Signal light (S1) in the longitudinal direction of the optical transmission fiber 1002 is small, and the nonlinear effect is thus can be reduced further. Furthermore, according to the Raman amplification light source system 10H, the Raman amplifying system 100H can operate not only as a Second-order pumping system but also as a Third or higher-order pumping system similar to the Raman amplifying system 100E.

Ninth Embodiment

Figure 12:
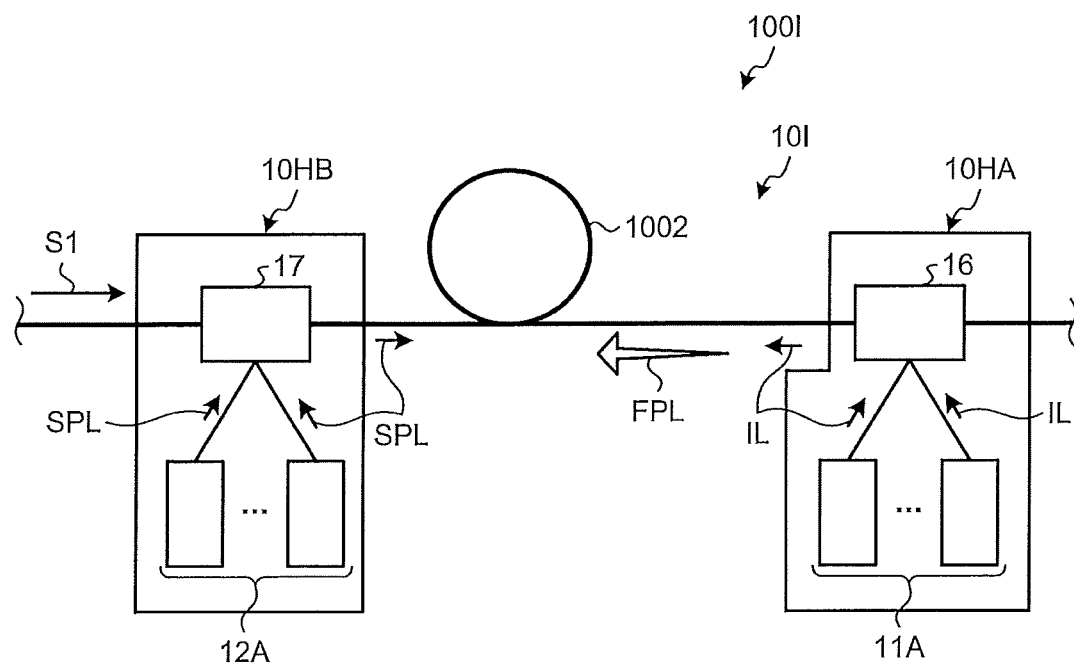
FIG. 12 is a schematic block diagram of a Raman amplifying system using a light source system for Raman amplification according to a ninth embodiment.

FIG. 12 is a schematic block diagram of a Raman amplifying system using a light source system for Raman amplification according to a ninth embodiment. A Raman amplifying system 100I includes a light source system for Raman amplification 10I (hereinafter "Raman amplification light source system 10I") and an optical transmission fiber 1002.

Similar to the Raman amplification light source system 10H, this Raman amplification light source system 10I also includes a first light source unit 10HA and a second light source unit 10HB. Further, the Raman amplification light source system 10I is similar to the Raman amplification light source system 10H in that a WDM coupler 16 and a WDM coupler 17 are connected to the optical transmission fiber 1002 so that incoherent light beams IL and Second-order pumping Light beams (SPL) propagate in the respective directions opposite to each other through the optical transmission fiber 1002 between the WDM coupler 16 and the WDM coupler 17. However, in contrast to the Raman amplification light source system 10H, the WDM coupler 16 and the WDM coupler 17 are connected to the optical transmission fiber 1002 so that the Incoherent Light beams (IL) propagate in a direction opposite to that of Signal light (S1) and the Second-order pumping Light beams (SPL) propagate in the same direction as that of the Signal light (S1).

In this Raman amplification light source system 10I as well, similar to the Raman amplification light source system 10H, in the optical transmission fiber 1002 between the WDM coupler 16 and the WDM coupler 17, the Incoherent Light beams (IL) input thereto are gradually Raman-amplified by the Second-order pumping Light beams (SPL), and First-order Pumping Light (FPL) having a wavelength that Raman-amplifies the Signal light (S1) is generated. However, in contrast to the case of the Raman amplification light source system 10H, the First-order Pumping Light (FPL) propagates in the direction opposite to that of the Signal light (S1) and Raman-amplifies the Signal light (S1). That is, the Raman amplifying system 100I is a Raman amplifying system of both the backward pumping type and the Second-order pumping type.

By this Raman amplification light source system 10I as well, the above described four needs can be fulfilled simultaneously. Further, according to the Raman amplification light source system 10I, the Raman amplifying system 100I can operate not only as a Second-order pumping system but also as a Third-order pumping system or a higher-order pumping system, similar to the Raman amplifying system 100E.

Tenth Embodiment

Figure 13:
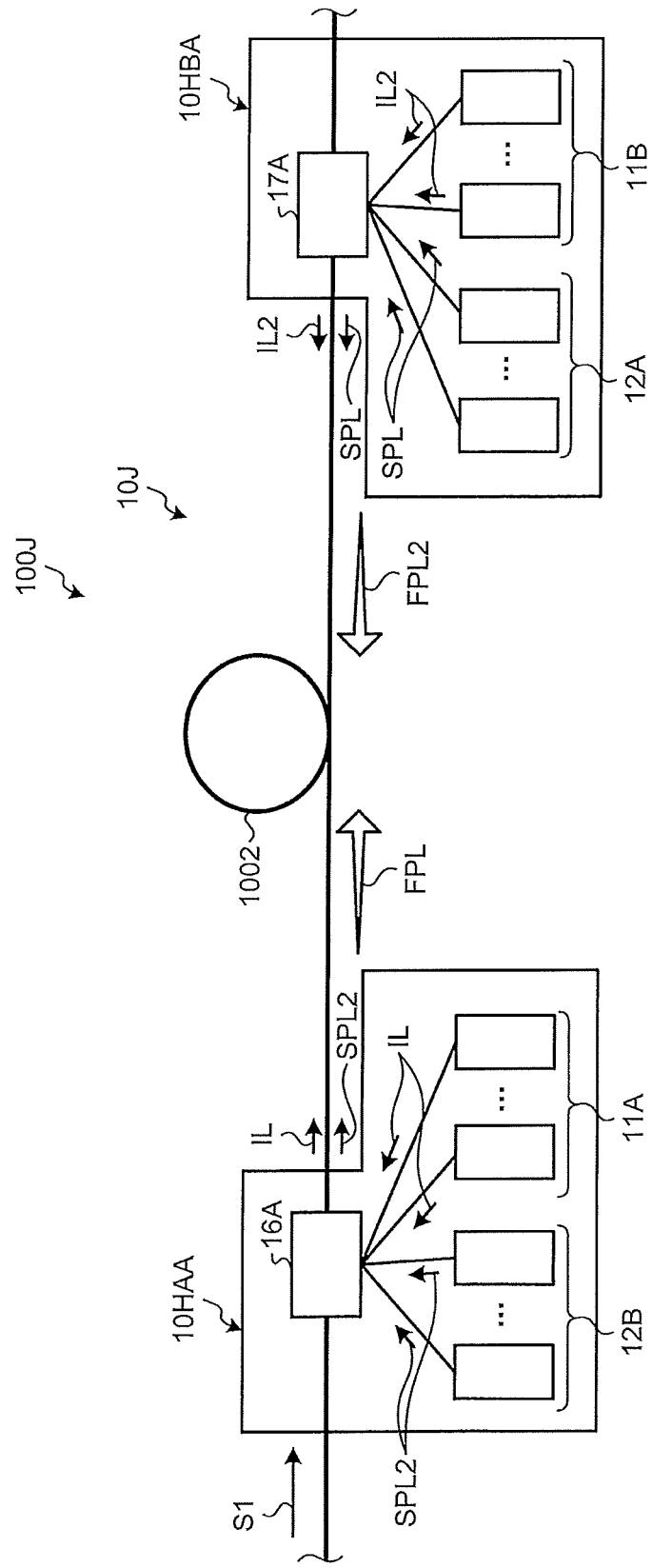
FIG. 13 is a schematic block diagram of a Raman amplifying system using a light source system for Raman amplification according to a tenth embodiment.

FIG. 13 is a schematic block diagram of a Raman amplifying system using a light source system for Raman amplification according to a tenth embodiment. A Raman amplifying system 100J includes a light source system for Raman amplification 10J (hereinafter "Raman amplification light source system 10J") and an optical transmission fiber 1002.

The Raman amplification light source system 10J includes a first light source unit 10HAA and a second light source unit 10HBA. The first light source unit 10HAA includes first plural incoherent light sources 11A that output incoherent light beams IL, second plural pumping light sources 12B that output second Second-order pumping Light beams (SPL2), and a WDM coupler 16A that is connected to the first plural incoherent light sources 11A, the second plural pumping light sources 12B, and the optical transmission fiber 1002, and serves as a first output unit that outputs the Incoherent Light beams (IL) and the second Second-order pumping Light beams (SPL2) to the optical transmission fiber 1002. The second light source unit 10HBA includes first plural pumping light sources 12A that output Second-order pumping Light beams (SPL), second plural incoherent light sources 11B that output second incoherent light beams IL2, and a WDM coupler 17A that is connected to the first plural pumping light sources 12A, the second plural incoherent light sources 11B, and the optical transmission fiber 1002, and serves as a second output unit that outputs the second Incoherent Light beams (IL2) and the Second-order pumping Light beams (SPL) to the optical transmission fiber 1002.

The second plural incoherent light sources 11B output the second Incoherent Light beams (IL2) having a wavelength that is Raman-amplified by the second Second-order pumping Light beams (SPL2) output by the second plural pumping light sources 12B. The first plural pumping light sources 12A output the Second-order pumping Light beams (SPL) having a wavelength that Raman-amplifies the incoherent light beams IL output by the first plural incoherent light sources 11A.

The WDM coupler 16A and the WDM coupler 17A are connected to the optical transmission fiber 1002 so that the Incoherent Light beams (IL) and the Second-order pumping Light beams (SPL) propagate in the respective directions opposite to each other through the optical transmission fiber 1002 between the WDM coupler 16A and the WDM coupler 17A, and the second Incoherent Light beams (IL2) and the second Second-order pumping Light beams (SPL2) propagate in the respective directions opposite to each other through the optical transmission fiber 1002 between the WDM coupler 16A and WDM coupler 17A. Thereby, specifically, the Incoherent Light beams (IL) and the second Second-order pumping Light beams (SPL2) propagate in the same direction as that of Signal light (S1), and the Second-order pumping Light beams (SPL) and the second incoherent light beams IL2 propagate in the direction opposite to that of the Signal light (S1).

In this Raman amplification light source system 10J, in the optical transmission fiber 1002 between the WDM coupler 16A and the WDM coupler 17A, the Incoherent Light beams (IL) input thereto are gradually Raman-amplified by the Second-order pumping Light beams (SPL), and First-order Pumping Light (FPL) having a wavelength that Raman-amplifies the Signal light (S1) is generated. Further, in this Raman amplification light source system 10J, in the optical transmission fiber 1002 between the WDM coupler 16A and the WDM coupler 17A, the second incoherent light beams IL2 input thereto are gradually Raman-amplified by the second Second-order pumping Light beams (SPL2), and second First-order Pumping Light (FPL2) having a wavelength that Raman-amplifies the Signal light (S1) is generated. The First-order Pumping Light (FPL) propagates in the same direction as that of the Signal light (S1), the second First-order Pumping Light (FPL2) propagates in the direction opposite to that of the Signal light (S1), and each of the First-order Pumping Light (FPL) and the second First-order Pumping Light (FPL2) Raman amplifies the Signal light (S1). That is, the Raman amplifying system 100J is a Raman amplifying system of both the bidirectional pumping type and the Second-order pumping type.

By this Raman amplification light source system 10J as well, the above described four needs can be fulfilled simultaneously. Further, since this Raman amplification light source system 10J is of the bidirectional pumping type, the freedom of design of power distribution of the Signal light (S1) in the longitudinal direction of the optical transmission fiber 1002 can be increased. For example, the longitudinal direction power distribution of the Signal light (S1), in addition to the amplified band, desired gain, and gain flatness of the Signal light (S1) to be amplified, can be adjusted based on the wavelengths, numbers, bands, and powers of the respective pumping light sources 12A and 12B and incoherent light sources 11A and 11B in each of the light source units 10HAA and 10HBA. Furthermore, in the Raman amplifying system 100J, the Second-order pumping Light that Raman-amplifies the incoherent light beams IL input from the front is not limited to the Second-order pumping Light beams (SPL) introduced from the back, and the second Second-order pumping Light beams (SPL2) input from the front may Raman-amplify the Incoherent Light beams (IL) input from the front. Which Second-order pumping light is to Raman-amplify which incoherent light depends on the design of the system. Moreover, according to the Raman amplification light source system 10J, the Raman amplifying system 100J can operate not only as a Second-order pumping system but also as a Third or higherorder pumping system similar to the Raman amplifying system 100E.

Figure 14:
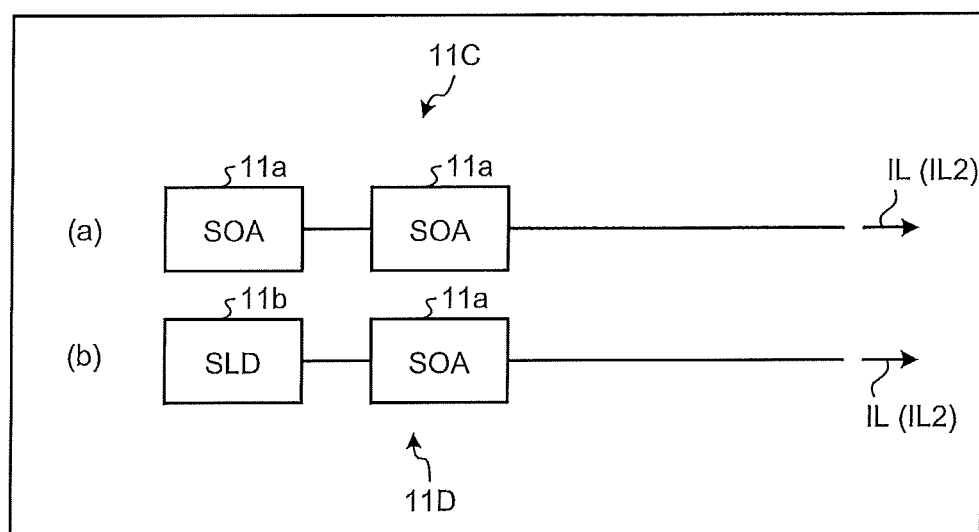
FIG. 14 is a diagram illustrating example configurations of incoherent light sources.

In the above described embodiments, the plural incoherent light sources 11, 11A, or 11B may include, as illustrated in part (a) in FIG. 14, an incoherent light source 11C that includes multistage-connected SOAs 11a and outputs incoherent light beams IL or IL2, or may include, as illustrated in part (b) in FIG. 14, an incoherent light source 11D that includes an SLD 11b and an SOA 11a, optically amplifies incoherent light output from the SLD 11b with the SOA 11a, and outputs the amplified incoherent light as incoherent light beams IL or IL2. Thereby, the power of the incoherent light beams IL or IL2 can be increased.

Further, it should be noted that the present disclosure is not limited by the above described embodiments. Those configured by combination of respective components described above as appropriate are also included in the present disclosure. Moreover, further effects and modifications can be derived easily by those skilled in the art. Therefore, wider aspects of the present disclosure are not limited to the above described embodiments, and various modifications may be made without departing from the spirit and scope of the present disclosure.

The present disclosure has an effect of realizing a light source for Raman amplification, a light source system for Raman amplification, a Raman amplifier, and a Raman amplifying system, which are able to simultaneously fulfill the above-described four needs.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source for Raman amplification to Raman-amplify, in an optical transmission fiber, signal light transmitted through the optical transmission fiber, the light source for Raman amplification comprising:
   plural incoherent light sources that output incoherent light;
   plural pumping light sources that output second-order pumping light having a wavelength that Raman-amplifies the incoherent light; and
   a coupler that is directly connected to the plural incoherent light sources, the plural pumping light sources, and the optical transmission fiber, and that is configured to output the incoherent light and the second-order pumping light that have been input thereto so that the incoherent light and the second-order pumping light propagate in the same direction through the optical transmission fiber, wherein
   in the optical transmission fiber, the incoherent light that has been input thereto is Raman-amplified by the second-order pumping light that has been input thereto, and first-order pumping light which has a wavelength that Raman-amplifies the signal light and which is to be transmitted in the optical transmission fiber in a direction in which the first-order pumping light forward pumps the signal light, is generated.

2. The light source for Raman amplification according to claim 1, comprising a pumping light source that outputs pumping light having a wavelength that Raman amplifies second-order pumping light output by at least one of the plural pumping light sources.

3. The light source for Raman amplification according to claim 1, wherein the plural incoherent light sources include at least one of a Super Luminescent Diode (SLD), a Semiconductor Optical Amplifier (SOA), and an Amplified Spontaneous Emission (ASE) light source including a rare earth doped optical fiber.

4. The light source for Raman amplification according to claim 1, wherein the plural incoherent light sources include an incoherent light source that has an SLD and an SOA, and that is configured to optically amplify incoherent light output from the SLD with the SOA, and to output the optically amplified incoherent light.

5. The light source for Raman amplification according to claim 1, wherein the plural incoherent light sources include an incoherent light source formed of multistage-connected SOAs.

6. The light source for Raman amplification according to claim 1, wherein the plural pumping light sources include at least one of Fabry-Perot (FP) semiconductor lasers, FP-FBG semiconductor lasers that are a combination of an FP semiconductor laser and an optical fiber Bragg grating (FBG), a distributed-feedback (DFB), and a distributed Bragg reflector DBR.

7. The light source for Raman amplification according to claim 1, wherein the plural incoherent light sources include an incoherent light source that outputs incoherent light beams of wavelength bandwidths different from each other.

8. A light source system for Raman amplification, comprising: two pieces of the light sources for Raman amplification according to claim 1, wherein the coupler of each of the light sources for Raman amplification is connected to the optical transmission fiber so that the first-order pumping light bidirectionally pumps the signal light.

9. The light source system for Raman amplification according to claim 8, wherein the plural incoherent light sources include at least one of a Super Luminescent Diode (SLD), a Semiconductor Optical Amplifier (SOA), and an Amplified Spontaneous Emission (ASE) light source including a rare earth doped optical fiber.

10. The light source system for Raman amplification according to claim 8, wherein the plural incoherent light sources include an incoherent light source that includes an SLD and an SOA and that is configured to optically amplify incoherent light output from the SLD with the SOA and to output the optically amplified incoherent light.

11. The light source system for Raman amplification according to claim 8, wherein the plural incoherent light sources include an incoherent light source formed of multistage-connected SOAs.

12. The light source system for Raman amplification according to claim 8, wherein the plural pumping light sources include at least one of Fabry-Perot (FP) semiconductor lasers, FP-FBG semiconductor lasers that are a combination of an FP semiconductor laser and an optical fiber Bragg grating (FBG), a distributed-feedback (DFB), and a distributed Bragg reflector (DBR), the semiconductor lasers having wavelengths different from each other.

13. The light source system for Raman amplification according to claim 8, wherein the plural incoherent light sources include an incoherent light source that outputs incoherent light beams of wavelength bandwidths different from each other.

14. A Raman amplifier, comprising:
   the light source system for Raman amplification according to claim 8; and
   the optical transmission fiber.

15. A Raman amplifying system, comprising:
   the light source system for Raman amplification according to claim 8; and
   the optical transmission fiber.

* * * * *